United States Patent
Wigren

(10) Patent No.: US 8,504,058 B2
(45) Date of Patent: Aug. 6, 2013

(54) METHOD AND ARRANGEMENT FOR HIGH PRECISION POSITION REFERENCE MEASUREMENTS AT INDOOR LOCATIONS

(75) Inventor: Torbjorn Wigren, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 570 days.

(21) Appl. No.: 12/278,126

(22) PCT Filed: Apr. 10, 2006

(86) PCT No.: PCT/SE2006/050068
§ 371 (c)(1),
(2), (4) Date: Aug. 1, 2008

(87) PCT Pub. No.: WO2007/089182
PCT Pub. Date: Aug. 9, 2007

(65) Prior Publication Data
US 2009/0023459 A1    Jan. 22, 2009

(30) Foreign Application Priority Data
Feb. 3, 2006  (SE) ........................... 0600254

(51) Int. Cl.
*H04W 24/00* (2009.01)
(52) U.S. Cl.
USPC .............. 455/456.1; 455/404.2; 455/420; 455/456.2; 455/457; 455/550.1; 379/207.12
(58) Field of Classification Search
USPC .......... 455/404.2, 414.1–414.2, 418–420, 455/456.1–457, 412.1, 550.1, 556.2, 67.11; 379/142.1, 207.12
See application file for complete search history.

(56) References Cited

U.S. PATENT DOCUMENTS 5,564,079 A    10/1996  Olsson
6,393,294 B1 *  5/2002  Perez-Breva et al. ...... 455/456.5
(Continued)

FOREIGN PATENT DOCUMENTS

JP  2003-204296    7/2003
JP  2003-264494    9/2003
(Continued)

OTHER PUBLICATIONS

International Search Report dated Dec. 22, 2006 (3 pages).
(Continued)

*Primary Examiner* — Vladimir Magloire
*Assistant Examiner* — Babar Sarwar
(74) *Attorney, Agent, or Firm* — Myers Bigel Sibley & Sajovec

(57) ABSTRACT

The present invention addresses generating of feasible high precision indoor positioning measurements. A positioning server sets up an interface to which ordinary users may connect with their cellular phones. Using this interface the user can select one out of a plurality of indoor locations where the cellular operator wishes to have high precision position reference measurements performed. The user moves to said indoor location and initiates at this location, by interaction with said interface, the reference measurement. By logging an identity of the user or the time of the positioning the selected indoor location can be correlated to a determined tag in the RAN. The tag together with the indoor location that has been selected by help of the interface towards the positioning server constitutes one tagged high precision position measurement.

16 Claims, 5 Drawing Sheets

U.S. PATENT DOCUMENTS

| | | | |
|---|---|---|---|
| 2001/0041570 A1* | 11/2001 | Kim | 455/437 |
| 2002/0080063 A1 | 6/2002 | Bloebaum et al. | |
| 2004/0180670 A1* | 9/2004 | Pande et al. | 455/456.1 |
| 2005/0270235 A1* | 12/2005 | Krumm et al. | 342/451 |

FOREIGN PATENT DOCUMENTS

| | | |
|---|---|---|
| JP | 2004-138562 | 5/2004 |
| JP | 2004-523153 (A) | 7/2004 |
| WO | WO 00/17737 | 3/2000 |

OTHER PUBLICATIONS

International Preliminary Examination Report dated Feb. 7, 2008 (6 pages).

Second Office Action, Chinese Patent Application No. 200680052089.X, Dec. 23, 2011.

Third Office Action, Chinese Patent Application No. 200680052089.X, Jul. 20, 2012.

* cited by examiner

| | 1 | 2 | 3 | 4 | 5 | 6 | 7 | 8 |
|---|---|---|---|---|---|---|---|---|
| Octet 1 | | Number of points | | | 1 | 0 | 1 | 0 |
| Octet 2 | | | | | | | | S1 |
| Octet 3 | Degrees of latitude of point 1 | | | | | | | |
| Octet 4 | | | | | | | | |
| Octet 5 | Degrees of longitude of point 1 | | | | | | | |
| Octet 6 | | | | | | | | |
| Octet 7 | | | | | | | | |
| ... | | | | | | | | |
| Octet 6n-4 | | | | | | | | Sn |
| Octet 6n-3 | Degrees of latitude of point n | | | | | | | |
| Octet 6n-2 | | | | | | | | |
| Octet 6n-1 | Degrees of longitude of point n | | | | | | | |
| Octet 6n | | | | | | | | |
| Octet 6n+1 | | | | | | | | |

METHOD AND ARRANGEMENT FOR HIGH PRECISION POSITION REFERENCE MEASUREMENTS AT INDOOR LOCATIONS

FIELD OF THE INVENTION

The present invention relates to methods and arrangements in cellular mobile communication systems, in particular to Adaptive enhanced cell identity positioning (AECID) indoor reference measurement generation.

BACKGROUND OF THE INVENTION

Adaptive enhanced cell identity positioning (AECID), as described, e.g., in the patent application PCT/SE2005/001485, is a positioning technology that refines the basic cell identity positioning method in a variety of ways. The AECID positioning method is based on the idea that high precision positioning measurements, e.g. assisted GPS (A-GPS) measurements, can be seen as points that belong to regions where certain cellular radio propagation condition persist. In its simplest form A-GPS measurements that are performed at the same time as a certain cell ID is valid represent A-GPS measurements that fall within a specific cell of a cellular system. The AECID positioning method recognizes this and introduces a tagging of high precision measurements according to certain criteria. This may for instance include the cell IDs that are detected by the terminal that performs the high precision position measurement,
the quantized path loss or signal strength measurements, wrt. to multiple radio base stations (RBSs), performed by the terminal that performs the high precision position measurement,
the quantized Round Trip Time (RTT, in WCDMA) or Timing Advance (TA, in GSM),
the quantized noise rise, representing the load of a code division multiple access (CDMA) system,
radio connection information, e.g. the radio access bearer (RAB),
quantized time.

It is important to note that tags consist of vectors of indices, each index taking an enumerable number of discrete values. Continuous variables used for tagging, like path loss, hence need to be quantized.

The second step of the AECID positioning method is to collect all high precision positioning measurements that have the same tag in separate high precision measurement clusters. It is clear that each such cluster consists of high precision position measurements collected from a region with similar radio conditions—hence the measurements are normally from the same well defined geographical region. More specifically, said geographical region is normally substantially smaller than the extension of a cell of the cellular system.

In a third step of the AECID positioning method, a polygon that represents the geographical extension of a cluster is computed, for each stored high precision position measurement cluster. The two most pronounced properties of the algorithm include that the area of the polygon is minimized (accuracy hence maximized) and that the probability that the terminal is within the polygon (the confidence) is precisely known (it is set as a constraint in the algorithm).

So far, steps towards the creation of a tagged database of polygons have been described. An AECID position is now easily determined by a first determination of the persisting tag. This is performed by looking up cell IDs, by performing auxiliary measurements and by looking up auxiliary connection information, as described above. The polygon corresponding to the determined tag is then looked up in the tagged database of polygons and followed by a reporting, e.g. over the RANAP interface as described in the document 3GPP TS 25.413, "UTRAN Iu interface Radio Access Network Application Part (RANAP) signaling", using the polygon format.

The preferred representation of the geographical extension of the cell is given by the cell polygon format. The extension of a cell is described by 3-15 corners of a closed polygon which does not intersect itself, cf. FIG. 2. The format is two-dimensional and the corners are determined as pairs of longitudes and latitudes in the WGS84 geographical reference system. The exact messaging format is described by FIG. 3. It should be noted that due to the complexity of the radio propagation the cell polygon format is only an approximation of the extension of the true cell. The selection of the polygon format is dictated by the need to have a reasonably flexible geographical representation format taking, e.g., computation complexities and reporting bandwidths into account. Since the polygon format approximates the cell extension, the polygon is normally pre-determined in the cell-planning tool to represent the cell extension. The underlying off-line calculation of the cell polygon can, e.g., be based on coverage simulations of varying levels of sophistication. However, the end result is normally not very reliable when the confidence of the calculated cell extension is considered.

High precision positioning methods are used to denote positioning methods that have a potential to meet the North-American E-911 emergency positioning requirements. Methods that meet these requirements are capable of obtaining positioning accuracies of either (terminal based) 50 meters (67%) and 150 m (95%), or (network based) 100 meters (67%) and 300 m (95%).

Assisted GPS (A-GPS) positioning is an enhancement of the global positioning system (GPS). An example of an A-GPS positioning system is displayed in FIG. 4. There GPS reference receivers attached to, e.g., a cellular communication system collect assistance data that, when transmitted to GPS receivers in terminals connected to the cellular communication system, enhance the performance of the GPS terminal receivers. Typically, A-GPS accuracy can become as good as 10 meters also without differential operation. However, the accuracy becomes worse in dense urban areas and indoors, where the sensitivity is most often not high enough for detection of the very weak signals from the GPS satellites.

Similarly to A-GPS the uplink time difference of arrival (UTDOA) positioning method is based on time of arrival measurements. However, in the UTDOA case measurements of transmissions from the UEs are performed in several RBSs. An advantage with UTDOA as compared to A-GPS is the fact that the signal strengths are higher, something that enhances the ability to perform positioning indoors. The accuracy of UTDOA is expected to be worse than that of A-GPS though, mainly because the radio propagation conditions are worse along the surface of the earth than when GPS radio signals are received from satellites at high elevation angles. For various reasons U-TDOA is also an expensive technology to deploy. There is also a counterpart to UTDOA specified by 3GPP and operating in the downlink, i.e. measurements of time of arrivals of radio signals transmitted by several RBSs are performed in the UE. In practice, however, this OTDOA-IPDL method lacks the sensitivity to provide any useful high precision performance.

Currently, it appears that A-GPS is becoming the dominating technology to obtain high precision positioning services. For the AECID method, the consequence is a difficulty to obtain high precision position reference measurements from indoor environments, a fact that will reduce applicability and accuracy of AECID positioning significantly. One alternative is to use dedicated personnel for surveying purposes, i.e. to make manual high precision positioning measurements in support of AECID. This is in fact the only known alternative for a cellular operator that has not deployed any other high precision positioning method than A-CPS. A disadvantage with manual measurements is that it requires dedicated personnel and equipment, both of which are expensive. The latter is particularly true since large areas needs to be surveyed to achieve a complete AECID coverage.

SUMMARY OF THE INVENTION

The present invention addresses the problem that current state of the art systems as described above cannot be applied to generate feasible high precision indoor positioning measurements.

It is thus an object of the present invention to achieve a method and arrangement for generating high precision positioning measurements indoors when using the AECID positioning method described above.

The present invention recognizes that a certain manual interaction will be needed for pointing out the exact location when determining a high precision position reference measurement and a corresponding tag. Instead of using dedicated personnel for achieving such measurements the present invention provides a method and arrangement where ordinary users are enabled to perform the reference measurement is suggested.

In a preferred embodiment a positioning server sets up an interface, e.g. an internet page, to which ordinary users may connect with their cellular phones. Using this interface the user can select one out of a plurality of indoor locations (also including, e.g., locations without A-GPS coverage) where the cellular operator wishes to have high precision position reference measurements performed.

The user is then required to move to said indoor location and initiates at this location, by interaction with said interface, the reference measurement. By logging the ID of the user, e.g. the phone number, or the time of the positioning, the selected indoor location can be correlated to a determined tag in the RAN. This correlating step can be performed in the positioning server or in another appropriate node, e.g. a support or positioning node of the RAN. The tag, which is generated in the RAN, together with the indoor location that has been selected by help of the interface towards the positioning server constitutes one tagged high precision position measurement. This information can be directly used for clustering in the AECID algorithm.

In a further embodiment of the present invention fraud can be avoided by help of an assisted CPS measurement for the reported location. Since this measurement fails indoors, a fraud can be detected in case A-GPS would nevertheless succeed. Further sanity checking can be performed by checking the identities of the cells that are detected by the positioned terminal against the selected indoor location.

In yet a further embodiment of the present invention users can be encouraged to provide high precision position reference measurements by coupling a reward to the delivery of successful high precision position measurements obtained by said positioning server.

BRIEF DESCRIPTION OF THE DRAWINGS

FIG. 3 shows a 3GPP polygon message information element (IE).

DESCRIPTION OF THE INVENTION

The description of the present invention uses the WCDMA system as a model system. However, it would be notwithstanding possible to apply this invention with only minor changes and adaptations in other systems, e.g. the GSM-system.

Figure 1:
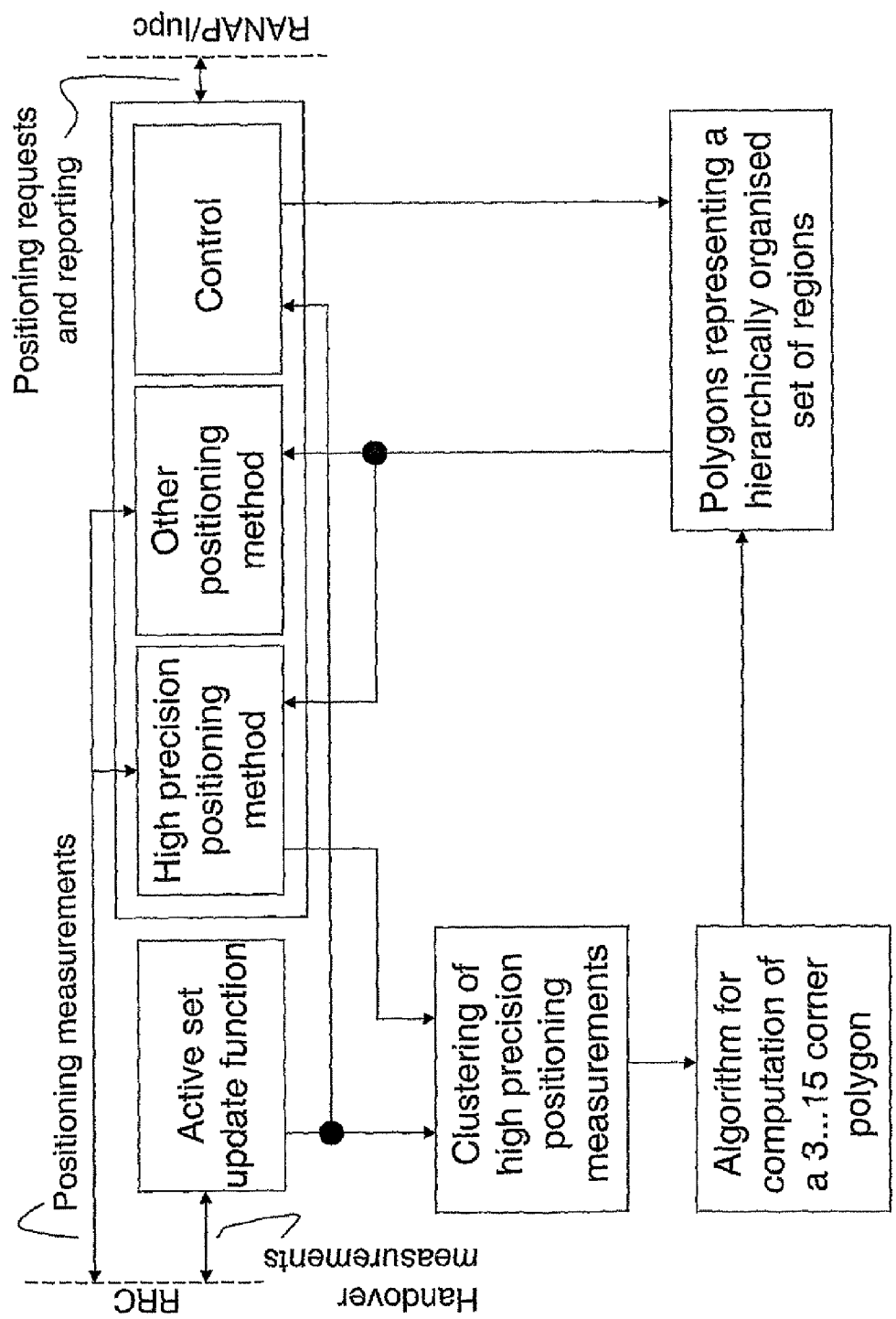
FIG. 1 illustrates a block diagram of the AECID positioning method.
Figure 2:
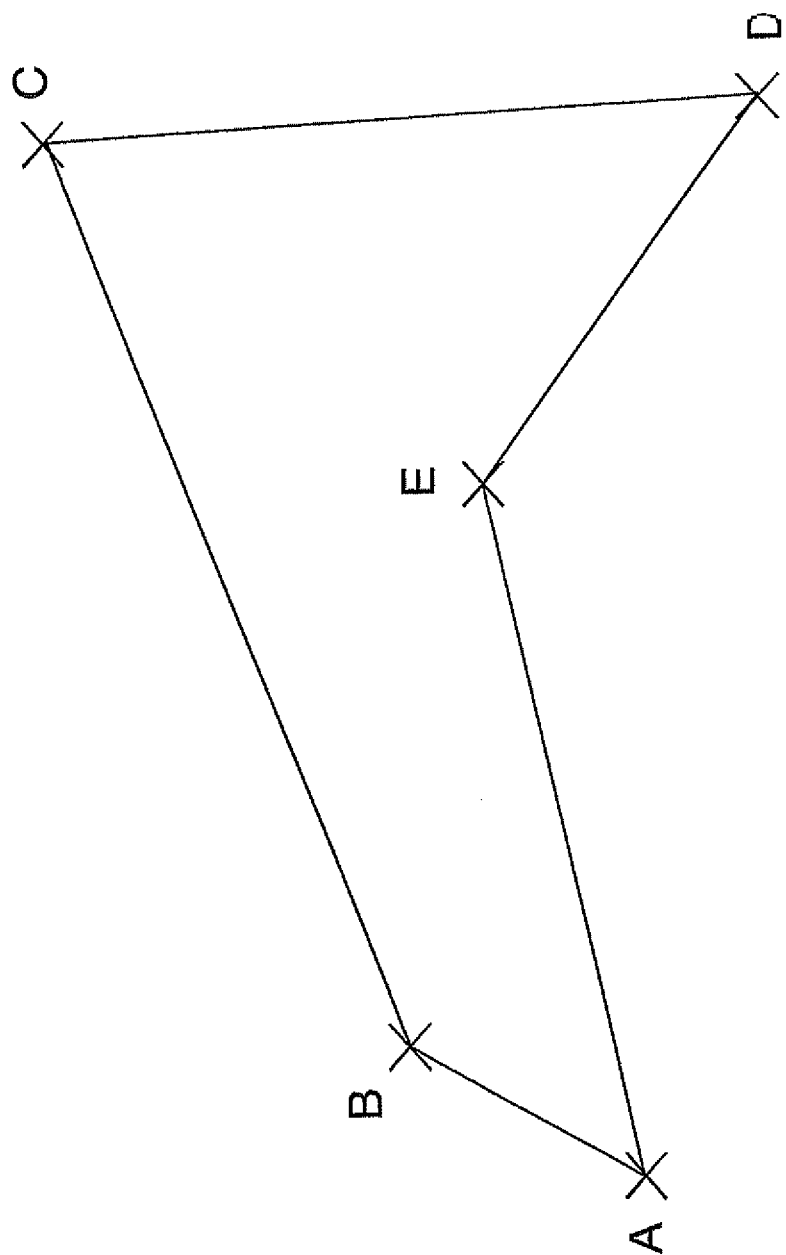
FIG. 2 illustrates an example of a cell polygon with corners A-E.
Figure 4:
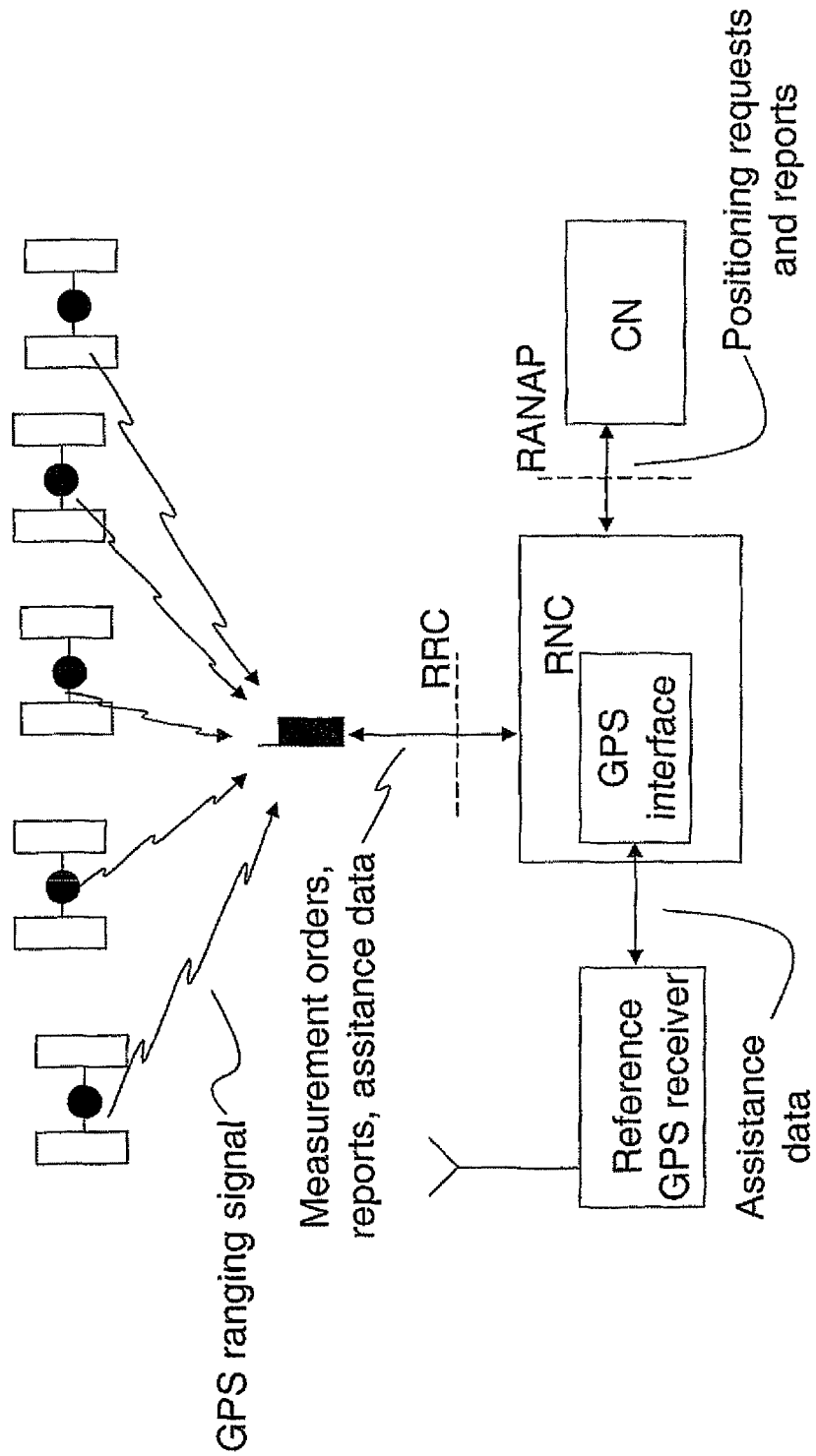
FIG. 4 shows an example of A-GPS implemented in a cellular communication system, in this case a WCDMA system. In this system the radio network controller (RNC) acts as the node that collects, refines and distributes assistance data to the terminals (denoted user equipment (UE) in WCDMA). The core network (CN) requests positioning of a UE over the RANAP interface. In response the RNC may use various kind of A-GPS techniques, all these techniques do however build on assistance data being handled by a node in the cellular communication system. The RNC orders positioning measurements to be performed in the UE, measurements that are performed by dedicated A-GPS receiver hardware in the terminals. These receivers detect GPS transmissions from the satellites that are also denoted space vehicles (SVs).
Figure 5:
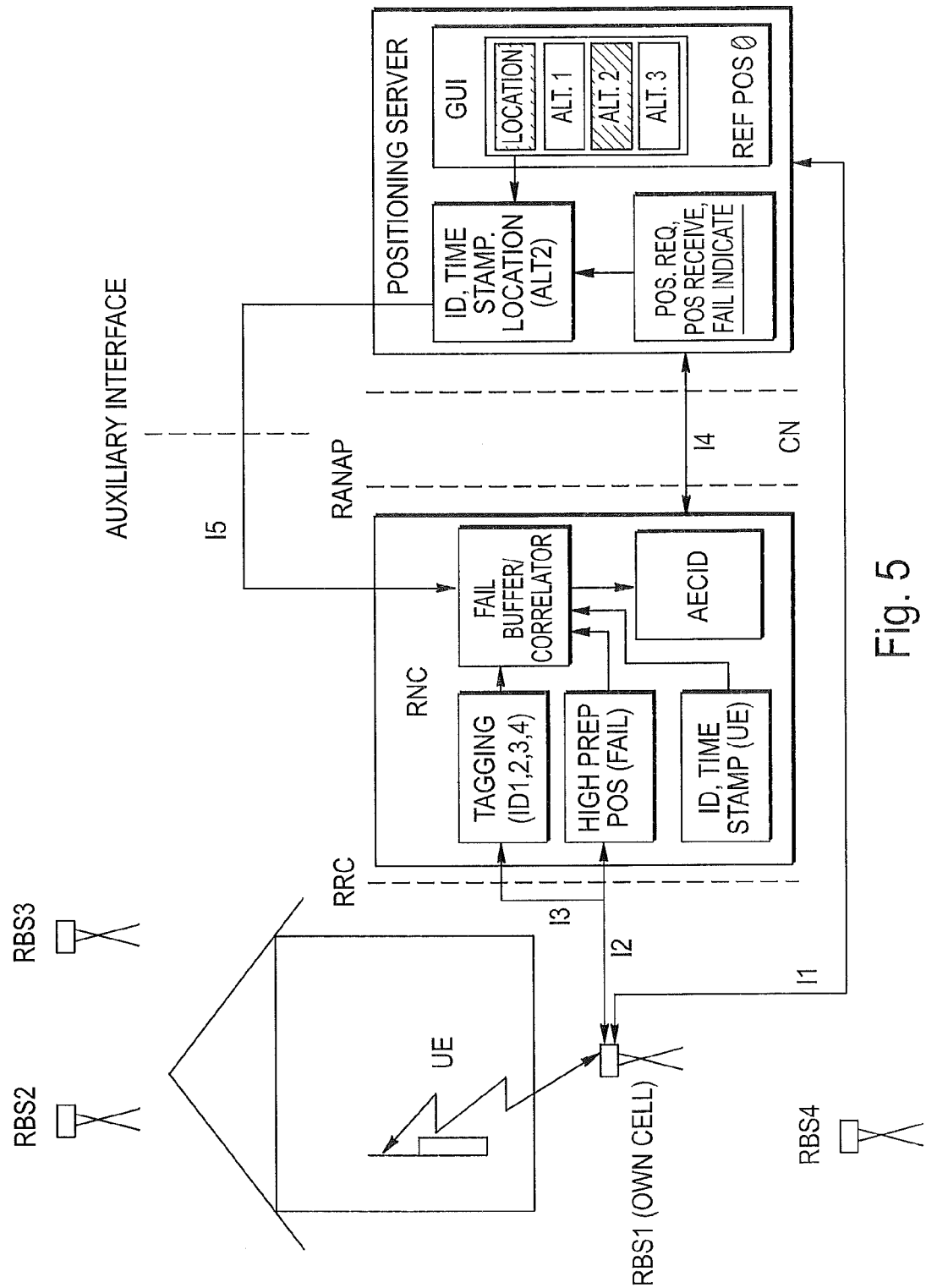
FIG. 5 illustrates a block diagram of the ordinary user based generation of high precision position measurements for the AECID positioning method.

The invention is described by help of the block diagram in FIG. 5. The main prerequisites of the invention include i) a positioning node of a cellular system equipped with ii) AECID positioning and iii) A-GPS positioning, iv) a positioning server with dedicated functionality, as described below. The following sequence of steps describe one non-limiting embodiment of the invention. All references are given with respect to FIG. 5.

A cellular user deciding to perform a high performance position measurement connects to the cellular system and accesses an interface of the positioning server, e.g. by navigating to a homepage of the positioning server. The connection is maintained over the chain of interfaces I1. Via said interface the user selects a reference location for the high performance position measurement, e.g. "Alt. 2" (Alternative 2) in the figure, and moves to the exact location according to the description for the reference location. Then, the user indicates to perform the reference positioning, e.g. by help of the "Perform reference positioning" button.

The Positioning server stores the time and ID of the user (if available). Otherwise the homepage can be designed so that the user can indicate an identity, e.g. a phone number. The positioning server issues a request to position the user. The quality of service parameters are selected to ensure an A-GPS positioning. The request is sent via the core network (CN) to the positioning node of the cellular system using the chain of interfaces I4. A particular 'client Type' IE may be used in order to indicate to the positioning node that the positioning attempt is for high precision position measurements for AECID. The positioning node decodes the quality of service parameters, decides that an A-GPS positioning is to be performed and issues the appropriate messages to the UE, using the interface I2.

At the same time AECID positioning is invoked. In this particular case the so called active set is sampled for the Cell IDs. The result is the Ids 1,2,3,4. The UE tries to perform an A-GPS positioning. However, since it is indoors, the attempt fails and the UE reports a failure to the positioning node.

The positioning node may attempt fallback positioning, in case the 'Client Type' IE does not indicate a high precision position measurement for AECID. In case this is indicated no fallback positioning is attempted and a failure is reported to the positioning server over the chain of interfaces I4. In case fallback positioning is attempted, a successful positioning may be obtained and reported over I4. However, since positioning method can be reported over RANAP, the positioning server can use this information to detect the failure. Another possibility is to study the reported position, investigating it for presence of altitude (proves A-GPS) or examining the obtained accuracy. The positioning node tags the failed A-GPS positioning with time and (if available) UE ID. The failed A-GPS positioning is furthermore tagged with the Cell IDs by the Tagging block, followed by storage in the Fail buffer correlator block as "failed". The positioning server detects the attempted position as "failed". It then tags the stored user selected location (e.g. "Alt. 2") with time and (if available) UE ID. The positioning server sends the tagged stored user selected location ("Alt. 2") to the positioning node of the cellular system over an interface, e.g. the auxiliary interface I5 in FIG. 5 (this could be an IP service interface for the RNC in the WCDMA case). When received in the Fail buffer/correlator of the positioning node, the positioning node compares the time and (if available) the UE ID with the failed positionings that are stored in the buffer, looking for a good enough best fit (in terms of time and possibly UE ID). If such a fit is found, the fail buffer/correlator block replaces the tag "failed" of the stored tagged positioning result, with the latitude and longitude of the user selected location (the latter information is assumed included in the messaging). The result is a high precision position measurement that can be exploited by AECID.

The high precision position measurement is sent on to AECID, possibly after further sanity checking using the positions of the cell Ids of the tag.

According to a conceivable embodiment of the present invention a message can be sent to indicate that the high precision position measurement attempt was successful and that a reward may be issued to the user.

The interface of the positioning server makes an indication that the attempt was successful and the user terminates the connection over I1.

There are a number of generalizations and variants. These include an implementation of selected parts of the functionality of the positioning node in another node, e.g. the OSS-RC node and/or an implementation of selected parts of the functionality of the positioning node in the positioning server.

The invention claimed is:

1. A method in a mobile telecommunication network for providing high precision position reference measurements at indoor locations, the method performed in one or several network nodes, the method comprising:
    providing a list of locations, said list accessible to a mobile user equipment; requesting from said mobile user equipment a high precision positioning measurement at one of said locations, said high precision positioning measurement being initiated by a user of said mobile user equipment at said one of said locations of said provided list of locations;
    obtaining said high precision positioning measurement from said mobile user equipment and determining whether said high precision positioning measurement from said mobile user equipment has failed;
    storing information entities received from said mobile user equipment, said information entities comprising one location from said list of locations and at least one of a time stamp or an identification of said mobile user equipment; and
    providing said information entities to a further network node only when said high precision positioning measurement is determined to have failed;
    wherein providing the list of locations accessible to the mobile user equipment comprises providing the list of locations via a graphical user interface associated with a positioning server.

2. The method according to claim 1, where said locations of said list of locations also include information about the geographical latitude and longitude of said locations.

3. The method according to claim 1, where said high precision positioning measurement is obtained by an assisted GPS positioning.

4. The method according to claim 1, where the method is performed in a positioning server and said further network node is a positioning node.

5. A method in a telecommunication network for generating high precision position reference measurements at indoor locations, the method performed in one or several network nodes, the method comprising:
    receiving information entities comprising one location from a list of locations and at least one of a time stamp or an identification of a mobile user equipment (UE) that has provided a high precision positioning measurement for said location, said high precision positioning measurement being initiated by a user of said mobile UE at said location included in said list of locations;
    determining a tag reflecting radio propagation conditions at a location of the UE;
    determining whether the high precision positioning measurement provided by the UE has failed; and
    in response to determining that the high precision positioning measurement provided by the UE failed, generating another high precision position measurement by correlating said information entities to said tag to output a tagged high precision position measurement that is provided to a positioning algorithm;
    wherein said list of locations is provided to said user of said mobile UE via a graphical user interface associated with a positioning server.

6. The method according to claim 5, where said tag is constructed from at least one of:
    quantized round trip time measurements;
    quantized timing advance measurements; and
    quantized noise rise measurements.

7. The method according to claim 5, where the method is performed in a positioning node receiving information entities from a positioning.

8. The method according to claim 5, where the high precision positioning measurement is obtained by an assisted GPS positioning.

9. An arrangement in a mobile telecommunication network for providing high precision position reference measurements at indoor locations, the arrangement located in one or several network nodes, the arrangement comprising:
    an interface providing access for a mobile user equipment to a list of locations; circuitry for requesting from said mobile user equipment a high precision positioning measurement, said high precision positioning measurement being initiated by a user of said mobile user equipment at one of said locations of said list of locations;
    circuitry for obtaining said high precision positioning measurement from said mobile user equipment;

circuitry for determining whether said high precision positioning measurement from said mobile user equipment has failed;

circuitry for storing of information entities comprising one location from said list of locations and at least one of a time stamp or an identification of said mobile user equipment; and circuitry for providing said information entities to a further network node only when said high precision positioning measurement is determined to have failed wherein said interface comprises a graphical user interface associated with a positioning server.

10. The arrangement according to claim 9, where said locations of said list of locations also include an information about a geographical latitude and longitude of said locations.

11. The arrangement according to claim 9, further comprising circuitry for ordering said mobile user equipment to generate said high precision positioning measurement using assisted GPS positioning.

12. The arrangement according to claim 9, where the arrangement is located in a positioning server and said further network node is a positioning node.

13. An arrangement in a mobile telecommunication network for generating high precision position reference measurements at indoor locations, the arrangement located in one or several network nodes, the arrangement comprising:

circuitry for receiving information entities comprising one location from a list of locations and at least one of a time stamp or an identification of a mobile user equipment (UE) that has provided a high precision positioning measurement for said location, said high precision positioning measurement being initiated by a user of said mobile UE at said location included in said list of locations;

circuitry for determining a tag reflecting radio propagation conditions at a location of the UE; and circuitry for determining whether the high precision positioning measurement provided by the UE has failed; and circuitry that is configured to respond to the determination that the high precision positioning measurement provided by the UE failed by generating another high precision position measurement by correlating said information entities to said tag for constituting to output a tagged high precision position measurement that is provided to a positioning algorithm;

wherein said list of locations is provided to said user of said mobile UE via a graphical user interface associated with a positioning server.

14. The arrangement according to claim 13, further comprising means for constructing said tag from at least one of:

quantized round trip time measurements;

quantized timing advance measurements; and quantized noise rise measurements.

15. The method according to claim 13, where the arrangement is located in a positioning node receiving information entities from a positioning server.

16. The arrangement according to claim 13, where the high precision positioning measurement provided by the UE is obtained by an assisted GPS positioning.

* * * * *

UNITED STATES PATENT AND TRADEMARK OFFICE
CERTIFICATE OF CORRECTION

PATENT NO. : 8,504,058 B2
APPLICATION NO. : 12/278126
DATED : August 6, 2013
INVENTOR(S) : Wigren Page 1 of 1

It is certified that error appears in the above-identified patent and that said Letters Patent is hereby corrected as shown below:

In the Specification

In Column 2, Line 56, delete "U-TDOA" and insert -- UTDOA --, therefor.

In Column 2, Line 60, delete "OTDOA-IPDL" and insert -- UTDOA-IPDL --, therefor.

In Column 3, Line 6, delete "A-CPS." and insert -- A-GPS. --, therefor.

In Column 3, Line 52, delete "CPS" and insert -- GPS --, therefor.

In Column 4, Line 23, delete "DESCRIPTION" and insert -- DETAILED DESCRIPTION --, therefor.

In Column 4, Line 56, delete "'client Type'" and insert -- 'Client Type' --, therefor.

In Column 5, Lines 15-16, delete "Fail buffer correlator" and insert -- Fail buffer/correlator --, therefor.

In Column 5, Line 26, delete "positionings" and insert -- positioning --, therefor.

In the Claims

In Column 7, Line 10, in Claim 9, delete "failed" and insert -- failed; --, therefor.

Signed and Sealed this
Twentieth Day of May, 2014

Michelle K. Lee
*Deputy Director of the United States Patent and Trademark Office*